United States Patent [19]
Tanaka et al.

[11] Patent Number: 5,162,157
[45] Date of Patent: Nov. 10, 1992

[54] SLIDING MATERIAL AND METHOD OF MANUFACTURING THE SAME

[75] Inventors: Tadashi Tanaka, Konan; Hidehiko Tamura, Aichi; Kiyohide Uenaka, Nagoya; Shigemasa Hakakoshi, Aichi, all of Japan

[73] Assignee: Daido Metal Company Ltd., Nagoya, Japan

[21] Appl. No.: 660,821

[22] Filed: Feb. 26, 1991

[30] Foreign Application Priority Data

Feb. 27, 1990 [JP] Japan ................................ 2-46871

[51] Int. Cl.$^5$ ................................................ G22F 7/00
[52] U.S. Cl. ..................................... 428/549; 428/550; 428/551; 419/9; 419/10; 419/35; 427/405; 427/409; 427/419.5
[58] Field of Search ............. 428/550, 551, 549; 419/9, 10, 35; 427/405, 409, 419.5

[56] References Cited

U.S. PATENT DOCUMENTS

| | | | |
|---|---|---|---|
| 4,666,787 | 5/1987 | Bickle et al. | 428/551 |
| 4,732,818 | 3/1988 | Pratt et al. | 428/551 |
| 4,865,922 | 9/1989 | Davies | 428/551 |

FOREIGN PATENT DOCUMENTS 3916950 8/1939 Japan .
912793 12/1962 United Kingdom .

Primary Examiner—Stephen J. Lechert, Jr.
Attorney, Agent, or Firm—Browdy and Neimark

[57] ABSTRACT

Disclosed are a sliding material comprising a backing metal having a porous metal layer formed on the surface thereof in which pores are defined and a composition for impregnation coating impregnated and coated to the pores and the surface thereof, wherein the composition for impregnation coating is a composition composed of (a) 5-30 vol % of metal lead having a relative surface area of 1,000-8,500 cm$^2$/g in an average particle size, and the remaining portion substantially composed of PTFE, a sliding material comprising a backing metal having porous metal layer formed on the surface thereof in which pores are defined and a composition for impregnation coating impregnated and coated to the pores and the surface thereof, wherein the composition for impregnation coating is a composition composed of (b) 5-30 vol % of metal lead having a relative surface area of 1,000-8,500 cm$^2$/g in an average particle size, 0.5-30 vol % of at least one kind selected from a group B (filler) composed of solid lubricant such as metal oxide, metal fluoride, graphite, and the like, a fiber material such as carbon fiber, glass fiber, and the like, and ceramics such as SiC, and the like, and the remaining portion substantially composed of PTFE, a total of the respective components other than the PTFE being 5.5-50 vol %, and a method of manufacturing a sliding material comprising the steps of impregnating and covering the above composition for impregnation coating (a) or (b) to the pores and the surface thereof defined in the porous metal layer formed on the surface of a backing metal, and thereafter baking the backing metal with the above composition for impregnation coating (a) or (b) in a neutral atmosphere or in a reducing atmosphere.

12 Claims, No Drawings

SLIDING MATERIAL AND METHOD OF MANUFACTURING THE SAME

BACKGROUND OF THE INVENTION

1. Technical Field of the Invention

The present invention relates to a sliding material excellent in friction and wear characteristics and a method of manufacturing the same.

The term "sliding material" used herein is to be understood as construction including plain bearing or bearing material or self-lubricating material which is suitable for use as antifriction material for producing sliding members; such as bearing bushes, shoes, slide plates, and sliding members used in clutches, brakes, etc., and collectors.

The term "plain baring or bearing material or self-lubricating material" is to be understood as including a steel backing to which is bonded a layer of porous bronze constituting a matrix in which the porous bronze at least at and adjacent to its exposed surface is impregnated with a mixture of PTFE and lead etc.

2. Prior Art

Conventional sliding materials and methods of manufacturing the same include a sliding material comprising a backing metal having a porous metal layer formed on the surface thereof in which pores are defined and the following composition for impregnation coating (a) or (b), as shown in, e.g., Japanese Patent Kokoku (Post Exam. Publication) No. 39-16950.

(a) PTFE (polytetrafluoroethylene) +20Pb (metal lead)

(b) PTFE+20PbO (lead oxide)

Here, attention must be paid to that the above Japanese Patent Kokai discloses coarse lead powder having a mesh of 300 B.S.S as the type of metal lead used as an example on lines 21 and 22 of the right column of page 1. The lead powder has a ratio of surface area to weight of 500 cm$^2$/g, it is found that the lead powder having such a very small relative surface area was used.

A sliding material and a method of manufacturing the same according to the technology as disclosed in the above prior art in which the lead powder having a very small relative area is used does not satisfy friction and wear characteristics when the sliding material is slid in a dry state, in the sliding characteristics thereof.

A problem to be solved by the present invention is to determine a size of metal lead by which the above friction and wear characteristics as an object are improved.

SUMMARY OF THE INVENTION

The present invention have found that the above problem can be solved by using fine lead powder in place of conventional coarse lead powder, i.e., lead powder having a large relative surface area of 1,000-8,500 cm$^2$/g in place of the conventional lead powder having a relative surface area of 500 cm$^2$/g as a means for solving the above problem. More specifically, there are provided the following sliding materials and methods of manufacturing the same (1)-(4).

(1) A sliding material comprising a backing metal having a porous metal layer formed on the surface thereof in which pores are defined and the following composition for impregnation coating (a) impregnated and coated to the pores and the surface thereof.

The composition for impregnation coating, which is a composition composed of:

(a) 5-30 vol % of metal lead having a relative surface area of 1,000-8,500 cm$^2$/g in an average particle size, and the remaining portion substantially composed of PTFE.

(2) A method of manufacturing a sliding material comprising the steps of impregnating and covering the composition for impregnation coating (a) described in the above (1) to the pores and the surface thereof defined in the porous metal layer formed on the surface of a backing metal, and thereafter baking the backing metal with the composition for impregnation coating (a) in a neutral atmosphere or in a reducing atmosphere.

(3) A sliding material comprising a backing metal having a porous metal layer formed on the surface thereof in which pores are defined and the following composition for impregnation coating (b) impregnated and coated to the pores and the surface thereof.

(b) 5-30 vol % of metal lead having a relative surface area of 1,000-8,500 cm$^2$/g in an average particle size, 0.5-30 vol % of at least one kind selected from a group B (filler) composed of solid lubricant such as metal oxide, metal fluoride, graphite, and the like, a fiber material such as carbon fiber, glass fiber, and the like, and ceramics such as SiC, and the like, and the remaining portion substantially composed of PTFE, a total of the respective components other than the PTFE being 5.5-50 vol %.

(4) A method of manufacturing a sliding material comprising the steps of impregnating and covering the composition for impregnation coating (b) described in the above (3) to the pores and the surface thereof defined in the porous metal layer formed on the surface of a backing metal and to the surface, and thereafter baking the backing metal with the composition for impregnation coating (b) in a neutral atmosphere or in a reducing atmosphere.

DETAILED DISCUSSION

When dispersed in PTFE, the metal lead powder has meritorious effects to cause the PTFE to be transferred to and deposited on a mating member (in general, steel or stainless steel) of the sliding material, which is said to provide low friction and wear characteristics. This phenomenon is disclosed in the above Japanese Patent Kokoku No. 39-16950 as a prior art.

Nevertheless, the present invention classified commercially available metal lead powder (to respective similar sizes) and combined the powder of different sizes in various ways to obtain a ratio of surface area to weight of 5,000 cm$^2$/g in an average particle size, which is ten times those of prior art of 500 cm$^2$/g, and it is found that this powder has greatly reduced friction and is less worn. This is due to the result of that the meritorious effects of the above transfer and deposition of PTFE were carried out more finely, more often and effectively.

The reason why a relative surface area is made to 1,000-8,500 cm$^2$/g is that when it is less than 1,000 cm$^2$/g, the friction and wear of a sliding material are similar to those of prior arts, and metal powder having a relative surface area exceeding 8,500 cm$^2$/g is difficult to be industrially produced.

An additive amount exceeding 30 vol % is difficult to keep the improvement in a wear-proofing property due to the brittleness of a material. Further, an additive amount less than 5 vol % cannot provide necessary friction and wear characteristics. Therefore, an additive amount is set to 5-30 vol %. The metal lead powder is made by gas atomizing, water atomizing, and stamp milling method.

Further, the addition of at least one kind selected from a group composed of solid lubricant such as metal oxide, metal fluoride, graphite, $MoS_2$, $WS_2$, PbS, and the like, a fiber material such as carbon fiber, and the like, and ceramics such as SiC improves the friction and wear characteristics. When, however, the one kind selected from the group is less than 0.5 vol %, the addition for improving the friction and wear characteristics results in no effect and thus has no meaning. In addition, the addition of the above one kind exceeding 30 vol % makes the sliding material brittle and thus the sliding material cannot be applied to a practical use. Thus, the above at least one kind must be in a range from 0.5 to 30 vol %.

The metal oxide includes oxides composed of a single material selected from Zn, Al, Sb, Y, In, Zr, Mo, Cd, Ca, Ag, Cr, Co, Ti, Si, Mn, Sn, Ce, W, Bi, Ta, Fe, Cu, Pb, Ni, Te, Nb, Pt, V, Pd, Mg, Li, and composite metal oxides such as $CoO\ Al_2O_3$, $TiO_2\ ZnO_2$, $PbO\ TiO_2$, $CoO\ SnO_2$, $MgO\ Al_2O_3$, $ZrO_2\ SiO_2$, $CoO\ Al_2O_3\ MgO$, $CoO\ Al_2O_3\ Cr_2O_3$, $CoO\ ZnO\ MgO$, $Pb_3O_4\ Sb_2O_3\ TiO_2$, $Cr_2O_3\ Sb_2O_3\ TiO_2$, $Cr_2O_3\ CuO\ MnO_2$, $CoO\ Cr_2O_3\ Fe_2O_3$, $CoO\ ZnO_2\ NiO_2\ TiO_2$, $CoO\ Cr_2O_3\ MnO_2\ Fe_2O_3$, the metal fluoride includes $PbF_2$, $AlF_3$, $CdF_2$, $BaF_2$, and the like, the fiber material includes natural fiber and artificial fiber such as carbon fiber, glass fiber, cotton (cellulose), asbestos, rockwool, potassium titanate fiber, aromatic polyamide fiber, and the like, and the ceramics includes SiC, TiC, TiN, $B_4C$, BN, $Si_3N_4$, AlN, HfN, TaN, WC, TaC, VC, ZrC and the like.

Note that, the metal lead powder used in the present invention is pure Pb powder which can be metallurgically produced. The metal lead powder has an oxidized extreme surface as generally as in the case of ordinary metal, but is gray or black when observed from the outside with a melting point of 327° C.

The large metal lead in the surface layer is contained in a composition mainly composed of PTFE, but since the PTFE is composed of small particles in a baking step, the composition has permeability and becomes susceptible to oxidation. Therefore, when friction and wear tests were carried out using a sliding member filled with completely oxidized lead, it had a performance and a cavitation-proofing property inferior to those of the sliding member of the present invention.

Therefore, the manufacturing method according to the present invention is characterized in that baking is carried out in a non-oxidizing atmosphere to prevent the sliding member from being partially oxidized.

EXAMPLES

Examples of the present invention will be described below.

Bronze powder was porously sintered on a copper plated steel backing metal and thereafter the compositions for impregnation coating shown in Table 1 were impregnated and coated to the pores and the surface thereof of the above porous bronze layer by passing the backing metal sintered with bronze powder through between rolls.

Next, the steel backing metal was baked in a usual atmosphere or in a non-oxidizing atmosphere at a temperature of 327°-400° and further caused to be passed through rolls to be formed to a uniform thickness. Thus, conventional sliding materials (Specimens No. 1-2) and sliding materials of the present invention (Specimens No. 3-12) were obtained.

Table 1 shows the test result of these specimens and Tables 2 and 3 show the test conditions thereof.

Note that the backing metal used in the present invention may be metal other than steel, e.g., stainless steel or copper alloy such as bronze, no plating may be applied between the backing metal and the porous layer, metal other than copper, or alloy may be plated therebetween, and the porous layer formed on the backing metal may be composed of metal or alloy other than copper alloy such as bronze, lead bronze, and the like.

Note that the reason why the baking is carried out in the neutral atmosphere or in the reducing atmosphere is to prevent the lead powder in the composition for impregnation coating from being oxidized in baking.

TABLE 1

| Distinction | Specimen No. | Composition for Impregnation Coating (vol %) | Relative Surface Area of Metal Lead or Lead Oxide ($cm^2/g$) | Result of Friction and Wear Tests | |
|---|---|---|---|---|---|
| | | | | Wear Amount ($\mu m$) | Friction Coefficient |
| Conventional Sliding Material | 1 | PTFE—20Pb | 500 | 50 | 0.143 |
| | 2 | PTFE—20PbO | 1,500 | 45 | 0.195 |
| Sliding Material of Present Invention | 3 | PTFE—5Pb | 5,000 | 33 | 0.120 |
| | 4 | PTFE—10Pb | 5,000 | 30 | 0.127 |
| | 5 | PTFE—20Pb | 5,000 | 27 | 0.130 |
| | 6 | PTFE—30Pb | 5,000 | 25 | 0.135 |
| | 7 | PTFE—20Pb | 1,000 | 30 | 0.125 |
| | 8 | PTFE—20Pb | 3,000 | 28 | 0.127 |
| | 9 | PTFE—20Pb | 7,000 | 24 | 0.133 |
| | 10 | PTFE—5Pb—2$PbF_2$ | 5,000 | 29 | 0.125 |
| | 11 | PTFE—10Pb-10 Carbon Fiber | 5,000 | 26 | 0.127 |
| | 12 | PTFE—20Pb—25PbO $TiO_2$—3$MoS_2$ | 5,000 | 20 | 0.130 |

TABLE 2

Test Conditions of Friction and Wear Tests

| | |
|---|---|
| Tester Used | Bush Tester |
| Specimen Size | Inside Dia. 20 mm × Outside Dia. 23 mm × Length 20 mm |
| Load | 50 Kgf/$cm^2$ |
| Speed | 0.1 m/sec |
| Time | 500 hours |
| Temperature | Room Temperature |
| Lubrication | none |
| Axis | Soft Steel 220 Hv |

TABLE 2-continued

Test Conditions of
Friction and Wear Tests

Surface Roughness 3.0 μm Rmax

TABLE 3

Test Conditions of
Cavitation-Proofing Test

| Tester Used | Dedicated Tester for Cavitation |
|---|---|
| Specimen Size | Longitudinal Length 40 × Lateral Length 40 × Thickness 1.5 (mm) |
| Resonance Frequency | 19 KHz |
| Output Power | 600 W |
| Liquid Used for Test | Water |
| Temperature of Test Liquid | Room Temperature |
| Gap between Hone and Specimen | 1 millimeter |
| Hone Diameter | 35 millimeters |
| Testing Time | 3 minutes |

As apparent from Table 1, when the conventional sliding materials (Specimens No. 1-2) are compared with the sliding materials of the present invention (Specimens 3-12), the friction and wear characteristics of the latter are greatly improved.

As a result, the sliding materials of the present invention can achieve the improvement in the friction and wear characteristics, which is the object of the present invention and very important in the sliding characteristics.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A sliding material comprising a backing metal having a porous metal layer formed on the surface thereof in which pores are defined and a composition for impregnation coating impregnated and coated to the pores and the surface thereof, wherein said composition for impregnation coating is a composition composed of:
   (a) 5-30 vol % of metal lead having a relative surface area of 1,000-8,500 $cm^2/g$ in an average particle size, and the remaining portion substantially composed of polytetrafluoroethylene.

2. A method of manufacturing a sliding material comprising the steps of
   impregnating and covering a porous metal layer formed on a surface of a backing metal with an impregnation coating composition composed of 5-30 vol % of metal lead having a relative surface area of 1,000-8,500 $cm^2/g$ in an average particle size, and the remaining portion substantially composed of polytetrafluoroethylene, and
   thereafter baking the backing metal with said composition for impregnation coating in a neutral atmosphere or in a reducing atmosphere.

3. A sliding material comprising a backing metal having porous metal layer formed on the surface thereof in which pores are defined and a composition for impregnation coating impregnated and coated to the pores and the surface thereof, wherein said composition for impregnation coating is a composition composed of:
   5-30 vol % of metal lead having a relative surface area of 1,000-8,500 $cm^2/g$ in an average particle size, 0.5-30 vol % of at least one member selected from the group consisting of a solid lubricant, a fiber material and a ceramic, and the remaining portion substantially composed of polytetrafluoroethylene, a total of the respective components other than the polytetrafluoroethylene being 5.5-50 vol %.

4. A method of manufacturing a sliding material comprising the steps of
   impregnating and covering a porous metal layer formed on a surface of a backing metal with a composition for impregnation coating composed of 5-30 vol % of metal lead having a relative surface area of 1,000-8,500 $cm^2/g$ in an average particle size, 0.5-30 vol % of at least one member selected from the group consisting of a solid lubricant, a fiber material, and ceramic, and the remaining portion substantially composed of polytetrafluoroethylene being 5.5-50 vol %, and
   thereafter baking the backing metal with said composition for impregnation coating in a neutral atmosphere or a reducing atmosphere.

5. A sliding material according to claim 3, wherein said solid lubricant is a metal oxide, a metal fluoride or graphite.

6. A sliding material according to claim 3, wherein said fiber material is carbon fiber or glass fiber.

7. A sliding material according to claim 3, wherein said ceramic is SiC.

8. A sliding material according to claim 7, wherein said solid lubricant is a metal oxide, a metal fluoride or graphite, and said fiber material is carbon fiber or glass fiber.

9. A method of manufacturing a sliding material according to claim 4, wherein said solid lubricant is a metal oxide, a metal fluoride or graphite.

10. A method of manufacturing a sliding material according to claim 4, wherein said fiber material is carbon fiber or glass fiber.

11. A method of manufacturing a sliding material according to claim 4, wherein said ceramic is SiC.

12. A method of manufacturing a sliding material according to claim 11, wherein said solid lubricant is a metal oxide, a metal fluoride or graphite, and said fiber material is carbon fiber or glass fiber.

* * * * *

UNITED STATES PATENT AND TRADEMARK OFFICE
CERTIFICATE OF CORRECTION

PATENT NO. : 5,162,157
DATED : November 10, 1992
INVENTOR(S) : TANAKA et al.

It is certified that error appears in the above-identified patent and that said Letters Patent is hereby corrected as shown below:

Column 6, Line 32, after "polytetrafluoroethylene" insert
--, and a total of respective compounds other the polytetrafluoroethylene--

Signed and Sealed this

Twenty-third Day of November, 1993

Attest:

BRUCE LEHMAN

Attesting Officer

Commissioner of Patents and Trademarks